United States Patent
Mossoba et al.

(10) Patent No.: US 12,118,543 B2
(45) Date of Patent: *Oct. 15, 2024

(54) UPDATING AUTOMATIC PAYMENT METHOD TO AVOID SERVICE DISRUPTION

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/573,713

(22) Filed: Jan. 12, 2022

(65) Prior Publication Data

US 2022/0138736 A1 May 5, 2022

Related U.S. Application Data

(62) Division of application No. 16/592,270, filed on Oct. 3, 2019, now Pat. No. 11,227,283.

(51) Int. Cl.
*G06Q 20/38* (2012.01)
*G06F 16/951* (2019.01)
*G06F 40/30* (2020.01)
*H04L 9/32* (2006.01)

(52) U.S. Cl.
CPC ....... *G06Q 20/3821* (2013.01); *G06F 16/951* (2019.01); *G06F 40/30* (2020.01); *H04L 9/3213* (2013.01)

(58) Field of Classification Search
CPC ............................................. G06Q 20/00–425
See application file for complete search history.

(56) References Cited

U.S. PATENT DOCUMENTS

| 8,311,942 | B1 * | 11/2012 | Mason | G06Q 10/10 |
| | | | | 705/34 |
| 9,530,130 | B2 * | 12/2016 | Rosano | G06Q 20/401 |
| 10,693,880 | B2 * | 6/2020 | Kurian | H04L 63/0853 |
| 10,699,289 | B1 * | 6/2020 | Dalton | G06Q 30/0238 |

(Continued)

OTHER PUBLICATIONS

White R., "How Computers Work," QUE, Seventh edition, Oct. 15, 2003, pp. 1-23.

*Primary Examiner* — Chenyuh Kuo
(74) *Attorney, Agent, or Firm* — Harrity & Harrity, LLP

(57) ABSTRACT

A device may obtain access to an email account associated with a user. The device may scan a set of emails in the email account associated with the user for one or more indicators related to an expiration status of an automatic payment method. The device may detect one or more emails in the scanned set of emails that contain the one or more indicators related to the expiration status of the automatic payment method. The device may perform one or more actions to maintain continuous service for one or more recurring payment accounts associated with the automatic payment method. The device may communicate with one or more merchant devices associated with the one or more recurring payment accounts to automatically replace the automatic payment method with an updated payment method.

20 Claims, 8 Drawing Sheets

(56) References Cited

U.S. PATENT DOCUMENTS

| | | | |
|---|---|---|---|
| 2005/0075977 A1* | 4/2005 | Carroll | G06Q 40/00 |
| | | | 705/40 |
| 2010/0299254 A1* | 11/2010 | Patterson | G06Q 20/10 |
| | | | 705/40 |
| 2014/0173695 A1* | 6/2014 | Valdivia | G06F 21/36 |
| | | | 726/4 |
| 2017/0053281 A1* | 2/2017 | Howe | G06Q 20/382 |
| 2017/0116585 A1* | 4/2017 | Rosano | G06Q 20/227 |
| 2019/0087894 A1* | 3/2019 | Bloy | G06Q 20/1085 |
| 2019/0340575 A1* | 11/2019 | Kankaria | G06F 21/30 |
| 2020/0058031 A1* | 2/2020 | Zhang | G06Q 20/102 |
| 2021/0103922 A1 | 4/2021 | Mossoba et al. | |

\* cited by examiner

UPDATING AUTOMATIC PAYMENT METHOD TO AVOID SERVICE DISRUPTION

RELATED APPLICATION

This application is a divisional of U.S. patent application Ser. No. 16/592,270, filed Oct. 3, 2019 (now U.S. Pat. No. 11,227,283), which is incorporated herein by reference in its entirety.

BACKGROUND

When subscribing to a service provider, users may elect to make recurring payments to the service provider via an automatic payment method. Some service providers may require authorization for recurring payments using the automatic payment method for the service providers to continue providing service. However, many automatic payment methods, such as those reliant on a transaction card, may expire. When an automatic payment method expires, service providers may discontinue service based on a failure of the automatic payment method.

SUMMARY

According to some implementations, a method may include receiving, by a device, a token from an authentication server that grants the device access to an email account associated with a user based on the user providing one or more credentials to the authentication server to authorize access to the email account by the device; providing, by the device, the token to an email server associated with the email account, wherein the device obtains the authorized access to the email account associated with the user based on the email server determining that the token is valid; scanning, by the device, a set of emails in the email account associated with the user for one or more indicators related to an expiration status of an automatic payment method; detecting, by the device, one or more emails in the scanned set of emails that contain the one or more indicators, wherein the one or more indicators include one or more key words indicating that the automatic payment method has expired or will be expiring within a threshold period; identifying, by the device, one or more recurring payment accounts associated with the automatic payment method that has expired or will be expiring within the threshold period; and performing, by the device, one or more actions to maintain continuous service for the one or more recurring payment accounts.

According to some implementations, a device may include one or more memories; and one or more processors, communicatively coupled to the one or more memories, configured to: obtain access to an email account associated with a user; scan a set of emails in the email account associated with the user for one or more indicators related to an expiration status of an automatic payment method; detect one or more emails in the scanned set of emails that contain the one or more indicators, wherein the one or more indicators include one or more key words indicating that the automatic payment method has expired or will be expiring within a threshold period; identify one or more recurring payment accounts associated with the automatic payment method that has expired or will be expiring within the threshold period; and perform one or more actions to maintain continuous service for the one or more recurring payment accounts, wherein the one or more processors, when performing the one or more actions, are further configured to: send, to a user device, one or more messages that provide the user device with an option to replace the automatic payment method with an updated payment method for the one or more recurring payment accounts.

According to some implementations, a non-transitory computer-readable medium may store one or more instructions. The one or more instructions, when executed by one or more processors of a device, may cause the one or more processors to: obtain access to a messaging account associated with a user; scan a set of messages in the messaging account associated with the user for one or more indicators related to an expiration status of an automatic payment method; detect one or more messages in the scanned set of messages that contain the one or more indicators related to the expiration status of the automatic payment method; and perform one or more actions to maintain continuous service for one or more recurring payment accounts associated with the automatic payment method, wherein the one or more instructions that cause the one or more processors to perform the one or more actions further cause the one or more processors to: communicate with one or more merchant devices associated with the one or more recurring payment accounts to automatically replace the automatic payment method with an updated payment method.

DETAILED DESCRIPTION

Figure 1A:
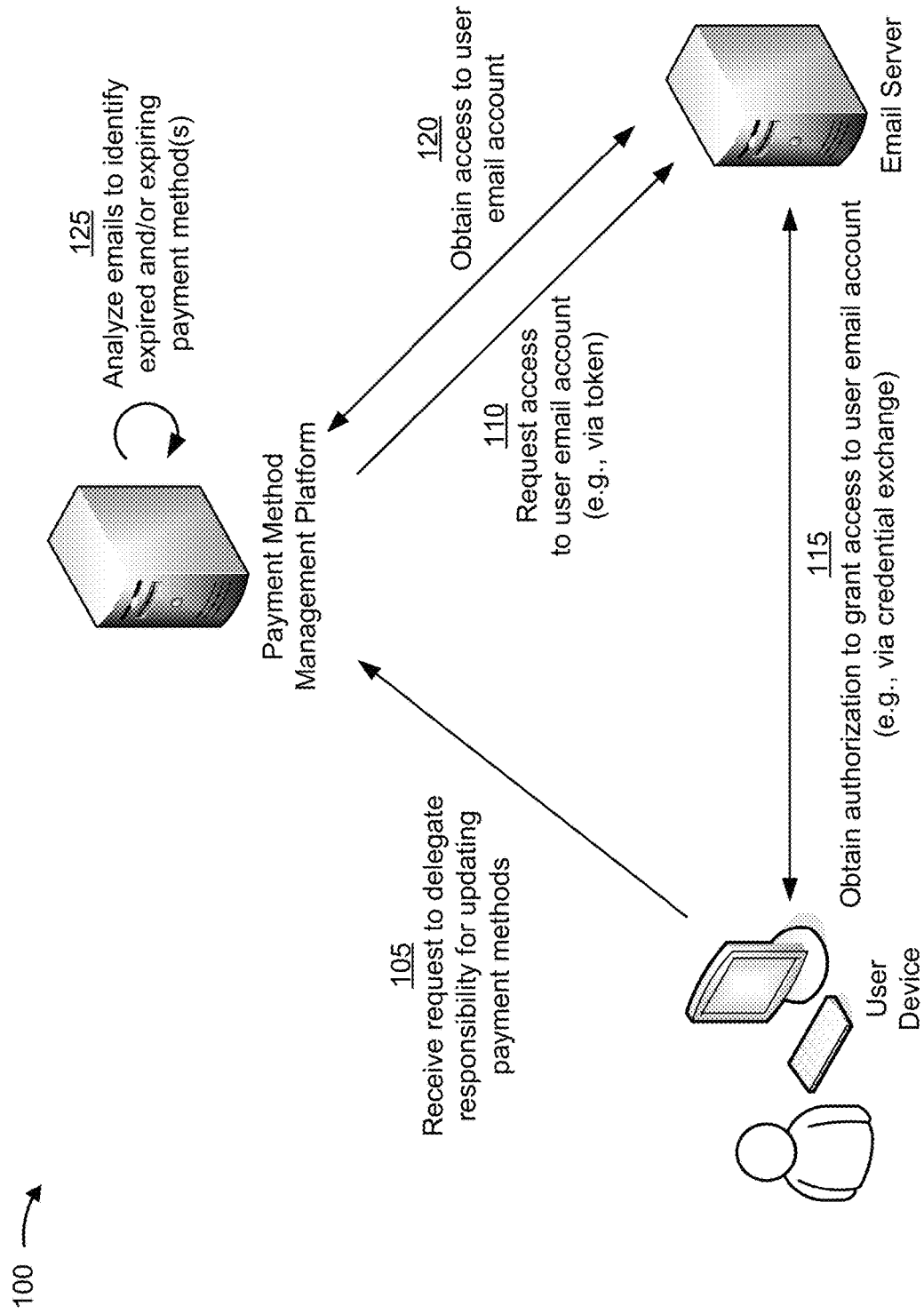
FIGS. 1A-1C are diagrams of one or more example implementations described herein.

The following detailed description of example implementations refers to the accompanying drawings. The same reference numbers in different drawings may identify the same or similar elements.

When subscribing to a service provider, users may elect to make recurring payments to the service provider via an automatic payment method. However, an automatic payment method may expire when payment information associated with the automatic payment method expires or otherwise is no longer valid. When the automatic payment method expires, the service provider may discontinue service based on a failure of the automatic payment method. Discontinued service may consume computing resources (e.g., processor resources, memory resources, communication resources, and/or the like) of the service provider as the service provider may attempt to charge the existing payment method multiple times to re-establish an account, cancel an account, void authorization keys, delete or archive files, and provide notifications of the discontinued service. In some instances, the user would like to maintain continuous service, but fails to provide updated information related to the automatic payment method. In such instances, reinstating an account consumes additional computing resources at the user's computing device, within a communication network, and at the service provider.

To reduce unintended discontinuance of service, some service providers send a message to a user to indicate an expiration status of an automatic payment method when the automatic payment method is expired or will expire within a threshold period. However, the user may choose to not view the message, the user may view the message and not respond, or a service through which the message is sent may automatically filter the message to a low-priority inbox or a spam folder such that the user is unaware of the message.

Some implementations described herein involve a device that identifies, from messages received at a messaging account associated with a user, indications that an automatic payment method, associated with one or more recurring payment accounts, has expired or will be expiring within a threshold period. In some implementations, the device obtains access to the messaging account using an OAuth token. For example, the device may receive a token from an authentication server and provide the authorization to a server that manages the messaging account. The device may scan the messaging account for indicators related to an expiration status of an automatic payment method (e.g., a transaction card). If an indicator is detected, the device can identify one or more recurring payment accounts that are associated with the automatic payment method. The device may then perform actions to maintain continuous service for the one or more recurring payment accounts by, for example, automatically updating or replacing the automatic payment method with one or more merchants in a manner that requires no action by the user.

In this way, computing resources at the user's computing device, the messaging account server, a communication network, and the service provider can be conserved by avoiding cancelation processes, which may include canceling the account, voiding authorization keys, deleting or archiving files, and providing notifications of the discontinued service to the user's computing device. Further, computing resources of the service provider may be conserved by avoiding account reinstatement processes, which may include generating new keys associated with the user for access to the service, restoring data that had been archived during discontinuance of service, generating and storing new service contracts, and providing notifications of the reinstatement of services to the user's computing device. Additionally, the user may have an improved experience with the service provider by avoiding discontinuance of service.

Figure 1B:
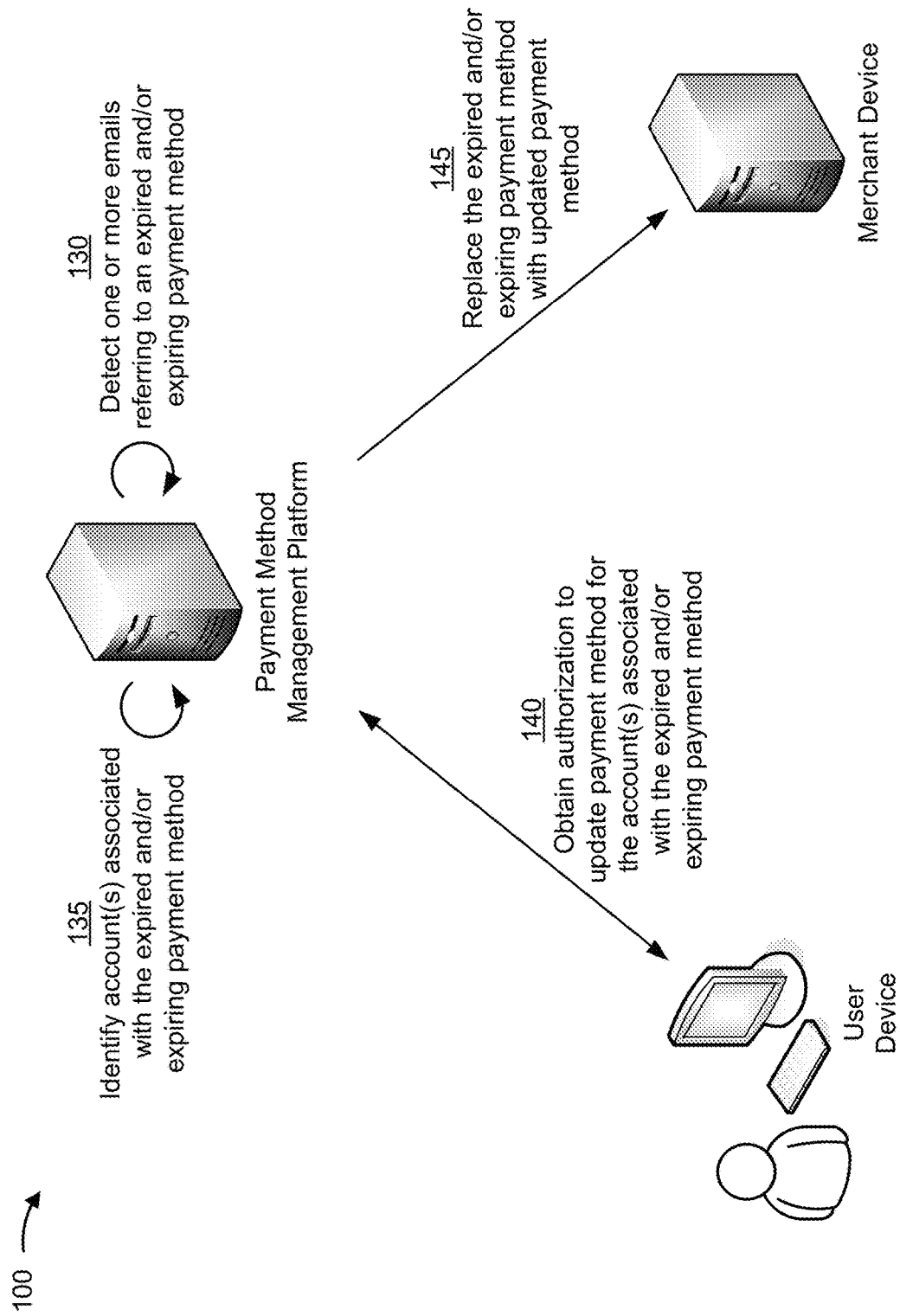
Figure 1C:
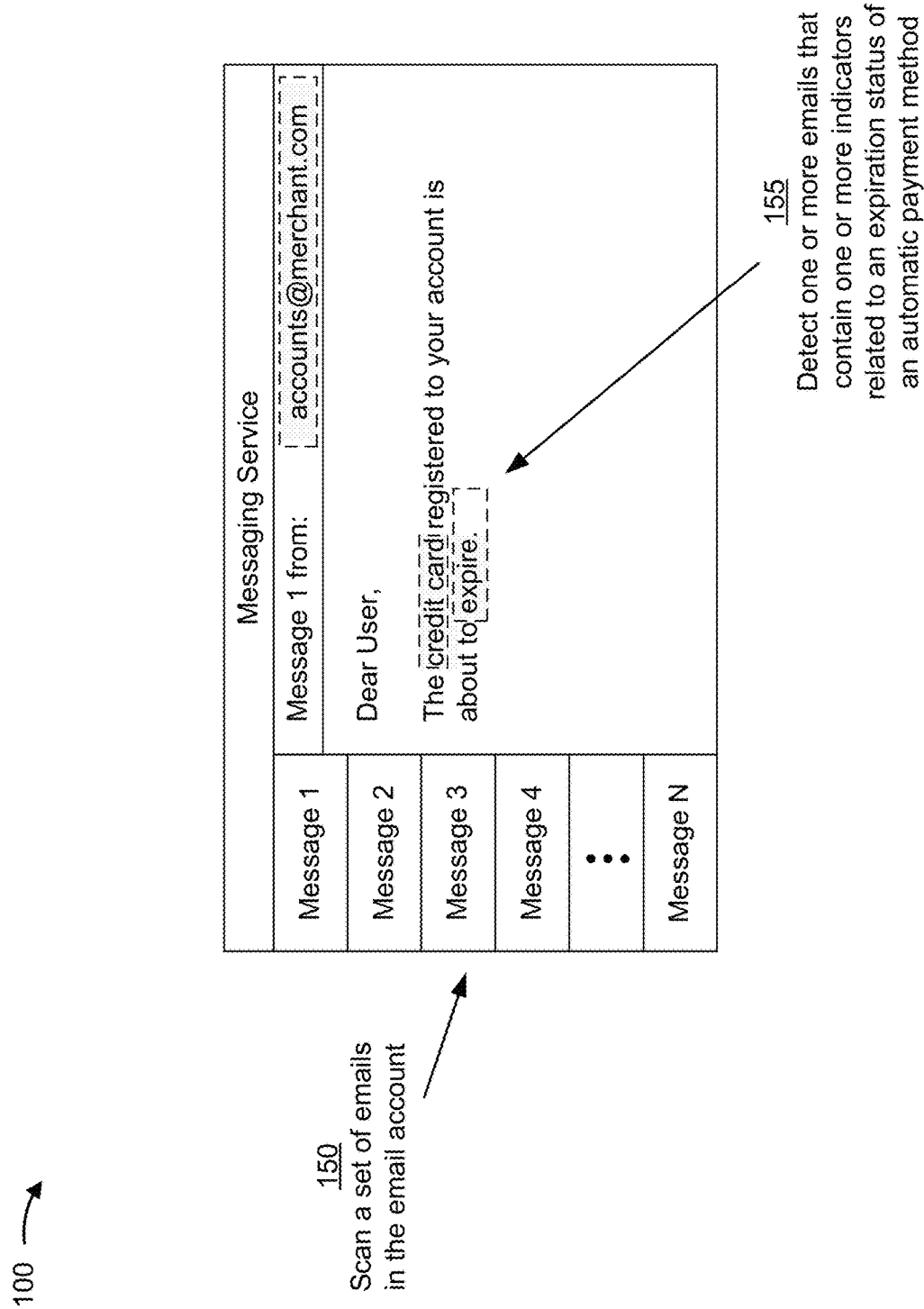

FIGS. 1A-1C are diagrams of one or more example implementations 100 described herein. As shown in FIGS. 1A-1C, the example implementation(s) 100 may include a user device, a payment method management platform, an email server, and a merchant device. In some implementations, a function described as being performed by one of these devices may be performed by a different one of these devices.

In some implementations, the email server hosts a user email account associated with a user. The user may link one or more recurring payment accounts to the user email account, such that service providers associated with the one or more recurring payment accounts may provide notifications to the user email account. Each of the recurring payment accounts may be associated with information such as payment information for an associated automatic payment method, a period for a recurring payment, an amount to bill for a provided service, the user email account identifier, and/or the like.

In some implementations, the payment method management platform may store, or have access to, payment information for one or more associated automatic payment methods for one or more users. For example, the payment method management platform may receive a request from the user device to create an account at the payment method management platform and/or to establish a relationship with the user. The payment method management platform may receive, or have access to, information to associate with the user (e.g., in an account at the payment method management platform) such as information relating to one or more automatic payment methods. For example, the information relating to one or more automatic payment methods may include a respective account identifier, expiration date, security code, billing address, and/or the like. The payment method management platform may receive, or gain access to, information to associate with the user based on receiving credentials or other authorization information from the user (e.g., via the user device or an authentication server) to access information relating to the one or more recurring payment accounts.

In some implementations, the payment method management platform is associated with an issuer (e.g., a financial institution) of at least one of the one or more automatic payment methods. In some of these implementations, the payment method management platform may receive authorization from a user (e.g., via the user device) to access payment information via the issuer of the at least one automatic payment method. The payment method management platform may receive payment information for others of the one or more automatic payment methods from one or more other devices, such as the user device and/or a device associated with an issuer of another of the one or more automatic payment methods.

As shown in FIG. 1A, and by reference number 105, the payment method management platform may receive, from a user device, a request to delegate responsibility for updating payment methods.

The payment method management platform may receive the delegation request via a browser extension executing on the user device and interfacing with one or more processors of the payment method management platform. In some implementations, the delegation request may identify one or more actions to be performed by the payment method management platform in response to detecting an indication that the automatic payment method has expired or will be expiring within a threshold period. For example, the delegation request may identify a procedure for selecting a new payment method to use in replacing the expired or expiring payment method. In some implementations, the delegation request includes credentials and/or a token-based authorization (e.g., Open Authorization or "OAuth") to access a user email account associated with the user of the user device.

By receiving the delegation request for updating payment methods, the payment method management platform is authorized to automatically manage one or more recurring payment accounts and/or automatic payment methods.

As shown by reference number 110, the payment method management platform may request, from an email server, access to an email account associated with the user (e.g., via token). In some implementations, the payment method management platform may request access to the email account based on the delegation request.

In some implementations, the payment method management platform may provide a token-based authorization to the email server associated with the email account as part of the request for access to the user email account. In some implementations, the payment method management platform may receive the token from an authentication server that grants the payment method management platform access to the email account associated with the user. For the payment method management platform to receive the token from the authentication server, the user may first provide (e.g., via the user device) one or more credentials to the authentication server to authorize access to the email account by the payment method management platform.

As shown by reference number 115, in some implementations, the email server may obtain authorization from the user device to grant access to the user email account for the payment method management platform. For example, in response to receiving the request for access to the user email account from the payment method management platform, the email server may transmit an authorization request to the user device through which the user device and the email server may exchange credentials to authorize the request. Alternatively, the user device may obtain authorization from the email server to grant access to the user email account. For example, the user device may request and obtain a token-based authorization such that the user device can provide the token-based authorization to the payment method management platform, thus providing access to the user email account without requiring giving full credentials to the payment method management platform. In this way, the user may provide access to the user email account without divulging secret credentials, which could put the credentials at risk of theft. Because many users link bank accounts and other sensitive information to user email accounts, avoiding disclosure of full credentials may prevent information theft, identity theft, and substantial computing resources that would be needed to identify, investigate, and recover from such theft.

As shown by reference number 120, the payment method management platform obtains access to the user email account (i.e., the email account associated with the user). In some implementations, the payment method management platform may obtain access to the user email account based on the email server determining that the token is valid. For example, the email server may compare the token with a registry in a storage component associated with, or accessible to, the email server. If the token is stored on the registry, the token may be determined to be valid. The registry may identify one or more email accounts to which access is authorized for each token of the registry. Therefore, in response to determining that the token is valid, the email server may grant access to the payment method management platform for the user email account based on the user email account being associated with the token.

Additionally, or alternatively, the registry may identify a type of access granted by the token. For example, the payment method management platform may obtain full access to the user email account. Alternatively, the payment method management platform may obtain only limited access to the user email account. For example, the payment method management platform may obtain read-only access to emails within the user email account. Additionally, or alternatively, the payment method management platform may obtain access to only emails that contain a particular characteristic. For example, the particular characteristic may be based on a sender email address, a sender email domain, specific words in an email header or body indicating an expiration status of an automatic payment method, payment method identifications, and/or the like.

Some implementations in which the payment method management platform may obtain access to an email account associated with a user may include the payment method management platform submitting credentials to the email account as provided by the user via the user device, the user registering the payment method management platform as an authorized user of the email account, and/or the like, as described above. In some implementations, the payment method management platform may obtain access to the email account in a different manner. For example, the payment method management platform may obtain access to the email account via an extension on a local application of the user device. In some implementations, the payment method management platform may obtain access to the email account via a web browser extension that allows the payment method management platform to access content presented on the user device via the web browser. In some implementations, the web browser extension may limit access by the payment method management platform to email content presented on the user device via the web browser.

As shown by reference number 125, the payment method management platform analyzes emails to identify expired and/or expiring automatic payment method(s). Examples of the analysis performed by the payment method management platform are described with regard to FIGS. 1B and 1C.

As shown in FIG. 1B, and by reference number 130, the payment method management platform may detect one or more emails referring to an expired and/or expiring method. For example, the payment method management platform may scan a set of emails in the email account associated with the user for one or more indicators related to an expiration status of an automatic payment method. The payment method management platform may then detect one or more emails in the scanned set of emails that contain the one or more indicators.

The one or more indicators may include one or more key words indicating that the automatic payment method has expired or will be expiring within a threshold period (e.g., a period of time). Additionally, or alternatively, the one or more indicators may include one or more email templates (e.g., a format of information or a subject description) providing a structure for notifying a user that the automatic payment method has expired or will be expiring within a threshold period.

The scan may include scanning the set of emails for the one or more indicators using a natural language processing technique. Additionally, or alternatively, the scan may include a direct key word search, a search for a plurality of numbers, letters, and/or symbols formatted to resemble some or all of a payment method account identifier, a search based on sender email domain addresses, and/or the like. In some implementations, the payment method management platform scans the set of emails based on the set of emails originating from one or more senders, or sender email domain addresses, that appear in a list (e.g., a whitelist). The list may identify one or more merchants having recurring payments registered with a credit report of the user. Additionally, or alternatively, the list may identify one or more merchants having recurring payments identified in one or more account statements of a payment method to which the payment method management platform has access.

As described herein, the payment method management platform may use one or more artificial intelligence techniques, such as machine learning, deep learning, and/or the like to determine whether content of an email (or other message) includes an indicator that is related to an expiration status of an automatic payment method ("expiration status indicator").

In some implementations, the payment method management platform may parse natural language contained in an email to determine whether the email contains one or more expiration status indicators. For example, the payment method management platform may obtain data identifying, in natural language, a description of content within an email, and may parse the data to identify parameters associated with an expiration status indicator.

In some implementations, the payment method management platform may determine that the content describes a characteristic of an automatic payment method and/or a recurring payment account based on natural language processing of emails, which may include descriptions of automatic payment methods and/or recurring payment accounts within the emails. For example, based on a description of an automatic payment method being "the credit card associated with your account is about to expire", the payment method management platform may use natural language processing to determine that a characteristic of an automatic payment method ("credit card") is that the automatic payment method is about to expire and that the automatic payment method is associated with a recurring payment account. Similarly, based on an email domain address of a sender of the email including "accounts@merchant.com", the payment method management platform may use natural language processing to determine that a characteristic of an email includes that the email is received from an account management department of a merchant. In this case, the payment method management platform may determine that a natural language text corresponds to an expiration status indicator based on data relating to a characteristic of an automatic payment method, data identifying characteristics other expiration status indicators, and/or the like. In this way, the payment method management platform may identify an expiration status indicator (e.g., using email addresses, key words, word formatting, sentence structure, subject lines, and/or the like) within an email, determine one or more characteristics of an associated automatic payment method and/or recurring payment account, and/or determine relationships between automatic payment methods and/or recurring payment accounts.

In this way, the payment method management platform may identify characteristics associated with expiration status indicators, as described herein. Based on applying a rigorous and automated process associated with identifying automatic payment methods, recurring payment accounts, relationships between automatic payment methods and/or recurring payment accounts, and/or expiration status indicators, the payment method management platform enables recognition and/or identification of thousands or millions of parameters associated with identifying automatic payment methods, recurring payment accounts, and/or expiration status indicators for thousands or millions of emails. This may increase an accuracy and consistency of identifying automatic payment methods, recurring payment accounts, relationships between automatic payment methods and/or recurring payment accounts, and/or expiration status indicators relative to requiring computing resources to be allocated for hundreds or thousands of technicians to manually identify automatic payment methods, recurring payment accounts, relationships between automatic payment methods and/or recurring payment accounts, and/or expiration status indicators of the thousands or millions of emails.

In some implementations, the payment method management platform may determine whether content of an email includes, or is likely to include, an expiration status indicator, as described herein. For example, analyzing key words, alphanumeric or other symbols formatted to resemble all or part of a payment method account identifier, an email address, and/or the like, the payment method management platform may determine whether content of an email includes, or is likely to include, an expiration status indicator. In this case, the payment method management platform may train an email scanning model. For example, the payment method management platform may train the email scanning model using information that includes key words, email addresses, format templates, alphanumeric or other symbols formatted to resemble all or part of a payment method account identifier and/or the like, to identify expiration status indicators. As an example, the payment method management platform may determine that historical key words, email addresses, format templates, and/or the like are associated with a threshold probability of being associated with an expiration status indicator. In some implementations, the payment method management platform may use a scoring system (e.g., with relatively high scores and/or relatively low scores) to identify and/or classify content of an email as being associated with an expiration status indicator. In this case, the payment method management platform may determine that a relatively high score (e.g., as being likely to be identified) is to be assigned to key words, email addresses, format templates, and/or the like that are determined to be the same or similar as previously identified key words, email addresses, format templates, and/or the like of expiration status indicators (or more frequently identified than past identified key words, email addresses, format templates, and/or the like). In contrast, the payment method management platform may determine that a relatively low score (e.g., as being unlikely to be identified) is to be assigned to key words, email addresses, format templates, and/or the like of content of emails that are determined to be different than past identified key words, email addresses, format templates, and/or the like of expiration status indicators (or less frequently identified than past identified key words, email addresses, format templates, and/or the like).

In some implementations, the payment method management platform may perform a data preprocessing operation when generating the email scanning model. For example, the payment method management platform may preprocess data (e.g., content of one or more emails and/or the like) to remove non-ASCII characters, white spaces, and/or the like. In this way, the payment method management platform may organize thousands, millions, or billions of data entries for machine learning and model generation.

In some implementations, the payment method management platform may perform a training operation when generating the email scanning model. For example, the payment method management platform may portion received information relating to key words, email addresses, format templates, and/or the like into a training set (e.g., a set of data to train the email scanning model), a validation set (e.g., a set of data used to evaluate a fit of the email scanning model and/or to fine tune the email scanning model), a test set (e.g., a set of data used to evaluate a final fit of the email scanning model), and/or the like. In some implementations, the payment method management platform may preprocess and/or perform dimensionality reduction to reduce the received information relating to key words, email addresses, format templates, and/or the like to a minimum feature set. In some implementations, the payment method management platform may train the email scanning model on this minimum feature set, thereby reducing processing to train the machine learning model, and may apply a classification technique, to the minimum feature set.

In some implementations, the payment method management platform may use a classification technique, such as a logistic regression classification technique, a random forest classification technique, a gradient boosting machine learning (GBM) technique, and/or the like, to determine a categorical outcome (e.g., that content contained in an email includes an expiration status indicator, that content contained in an email does not include an expiration status indicator, and/or the like). Additionally, or alternatively, the payment method management platform may use a naïve Bayesian classifier technique. In this case, the payment method management platform may perform binary recursive partitioning to split the data of the minimum feature set into partitions and/or branches and use the partitions and/or branches to perform predictions (e.g., that content of an email does or does not include an expiration status indicator). Based on using recursive partitioning, the payment method management platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the payment method management platform may use a support vector machine (SVM) classifier technique to generate a non-linear boundary between data points in the training set. In this case, the non-linear boundary is used to classify test data (e.g., data relating to content of emails) into a particular class (e.g., a class indicating that the content includes an expiration status indicator, a class indicating that the content does not include an expiration status indicator, and/or the like).

Additionally, or alternatively, where the test data includes image data, video data, and/or the like, the payment method management platform may use a computer vision technique, such as a convolutional neural network technique to assist in classifying test data (e.g., data relating to content of an email) into a particular class (e.g., a class indicating that the content of an email includes an expiration status indicator, a class indicating that the content of an email does not include an expiration status indicator, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the payment method management platform may train the email scanning model using a supervised training procedure that includes receiving input to the email scanning model from a subject matter expert, which may reduce an amount of time, an amount of processing resources, and/or the like to train the email scanning model relative to an unsupervised training procedure. In some implementations, the payment method management platform may use one or more other model training techniques, such as a neural network technique, a latent semantic indexing technique, and/or the like. For example, the payment method management platform may perform an artificial neural network processing technique (e.g., using a two-layer feedforward neural network architecture, a three-layer feedforward neural network architecture, and/or the like) to perform pattern recognition with regard to patterns of whether content of an email includes an expiration status indicator described using different semantic descriptions or not. In this case, using the artificial neural network processing technique may improve an accuracy of a model (e.g., email scanning model) generated by the payment method management platform by being more robust to noisy, imprecise, or incomplete data, and by enabling the payment method management platform to detect patterns and/or trends undetectable to human analysts or systems using less complex techniques.

As an example, the payment method management platform may use a supervised multi-label classification technique to train the email scanning model. For example, as a first step, the payment method management platform may map key words, email addresses, format templates, and/or the like to an expiration status indicator. In this case, the key words, email addresses, format templates, and/or the like may be characterized as being an expiration status indicator or not based on characteristics of the key words, email addresses, format templates, and/or the like (e.g., whether a characteristic of a key word, email address, format template, and/or the like is similar or associated with a key word, email address, format template, and/or the like that includes an expiration status indicator) and an analysis of the a key word, email address, format template, and/or the like (e.g., by a technician, thereby reducing processing relative to the payment method management platform being required to analyze each activity). As a second step, the payment method management platform may determine classifier chains, whereby labels of target variables may be correlated (e.g., in this example, labels may be key word, email address, format template, and/or the like and correlation may refer to a common characteristic of a key word, email address, format template, and/or the like that includes an expiration status indicator). In this case, the payment method management platform may use an output of a first label as an input for a second label (as well as one or more input features, which may be other data relating to the content of an email), and may determine a likelihood that particular content of an email that includes a set of characteristics (some of which are associated with a particular expiration status identifier and some of which are not associated with the particular expiration status identifier) are associated with the particular expiration status identifier based on a similarity to a key word, email address, format template, and/or the like that include similar characteristics. In this way, the payment method management platform transforms classification from a multilabel-classification problem to multiple single-classification problems, thereby reducing processing utilization.

As a third step, the payment method management platform may determine a Hamming Loss Metric relating to an accuracy of a label in performing a classification by using the validation set of the data. For example, an accuracy with which a weighting applied to each key word, email address, format template, and/or the like and whether each key word, email address, format template, and/or the like is associated with an expiration status indicator or not, results in a correct prediction of whether content of an email includes an expiration status indicator, thereby accounting for differing amounts to which association of any one key word, email address, format template, and/or the like influences a determination of whether content of an email includes and expiration status indicator.

As a fourth step, the payment method management platform may finalize the email scanning model based on labels that satisfy a threshold accuracy associated with the Hamming Loss Metric and may use the email scanning model for subsequent prediction of whether content of an email includes an expiration status indicator.

As another example, the payment method management platform may determine, using a linear regression technique, that a threshold percentage of key words, email addresses, format templates, and/or the like, in a set of content from emails, do not include an expiration status indicator, and may determine that those key words, email addresses, format templates, and/or the like are to receive relatively low association scores. In contrast, the payment method management platform may determine that another threshold percentage of key words, email addresses, format templates, and/or the like, in a set of content from emails, do include an expiration status indicator, and may assign a relatively high association score to those key words, email addresses, format templates, and/or the like. Based on the characteristics of key words, email addresses, format templates, and/or the like including an expiration status indicator or not, the payment method management platform may train the email scanning model and may use the email scanning model for analyzing new key words, email addresses, format templates, and/or the like that the payment method management platform identifies.

In some implementations, a different device, such as a server device, may generate and train the email scanning model. The different device may send the email scanning model for use by the payment method management platform. The different device may update and send (e.g., on a scheduled basis, on an on-demand basis, on a triggered basis, on a periodic basis, and/or the like) the email scanning model to the payment method management platform.

Accordingly, the payment method management platform may use any number of artificial intelligence techniques, machine learning techniques, deep learning techniques, and/or the like to determine whether content of an email includes an expiration status indicator.

The email scanning model may use and/or train an email classification module to determine whether an email contains an expiration status indicator. In some implementations, the email scanning model may determine whether an email includes an expiration status indicator so that the email scanning model can analyze only those emails determined to include an expiration status indicator when determining whether content of emails in a user email account includes an expiration status indicator. For example, based on data relating to hundreds, thousands, millions or more elements of content within emails of one or more email accounts or corresponding templates, the email scanning model may determine a classification of an email as a notification email (e.g., an email containing an expiration status indicator) and/or a probability that an email contains an expiration status indicator. In this case, the email classification module may be an item-based collaborative filtering model, a single value decomposition model, a hybrid recommendation model, and/or another type of model that enables a determination of a classification of an email based on a template, sender email address or email domain, timing of sending an email, and/or the like. The email classification module may be generated as described above with regard to the email scanning model.

The payment method management platform may train the email scanning model using a repository of emails that include labels identifying each email as being or not being a notification email (e.g., an email that includes an indicator relating to an expiration status of an automatic payment method). In some implementations, the emails in the repository may be associated with a plurality of users and may be anonymized.

In some implementations, the email scanning model can be trained to determine parameters common to the notification emails. For example, the email scanning model may identify terms, phrases, templates, formatted alphamerical sequences, and/or the like that are indicative of notification emails. The email scanning model may use a scoring scheme, with scores assigned to terms, phrases, templates, alphamerical sequences formatted as a payment method identifier or payment account identifier, and/or the like. Terms, phrases, templates, formatted alphamerical sequences, and/or the like having relatively high scores may be used as indicators that an automatic payment method has expired according to the techniques described herein.

In some implementations, the payment method management platform may use a machine learning model, such as an email classification model, to identify one or more emails that are notification emails (e.g., emails that contain one or more indicators). In some implementations, the payment method management platform may train the email classification model based on one or more parameters common to emails that are labeled as notification emails. For example, the payment method management platform may train the email classification model using a repository of emails that include labels identifying each email as being or not being a notification email (e.g., based on whether a respective email includes an indicator relating to an expiration status of an automatic payment method). In some implementations, the emails in the repository may be associated with a plurality of users and may be anonymized.

In some implementations, the email classification model may be trained to predict whether an email within the user email account is a notification email. In some implementations, the email classification model predicts that an email within the user email account is a notification email based on the email having one or more parameters in common with emails labeled as notification emails within the repository. For example, the email classification model may assign scores to each of the emails based on the parameters common to emails that are labeled as notification emails. In some implementations, the email classification model may then classify an email as a notification email based on having a score that satisfies a threshold.

In some implementations using a machine learning model, the payment method management platform may efficiently identify notification emails, or indicators within notification emails, of the user email account while using fewer computing resources than may be required to parse every alphanumeric character of every email in the user email account in real time.

As shown by reference number 135, the payment method management platform may identify account(s) (e.g., one or more recurring payment accounts) associated with the automatic payment method that has expired or will be expiring within the threshold period. For example, the email that contains the one or more indicators may identify a recurring payment account along with an identification of an associated expired or expiring automatic payment method.

The identification of the expired or expiring automatic payment method may be an incomplete identification, such as a partial account identifier. In some implementations, the payment method management platform compares the partial account identifier with one or more full account identifiers of associated automatic payment methods, stored in a storage component associated with, or accessible to, the payment method management platform, to identify the full account identifier or another identification of the expired or expiring automatic payment method.

If the payment method management platform identifies the full account identifier or another identification of the expired or expiring automatic payment method, the payment method management platform may further identify information for updating the expired or expiring automatic payment method. For example, the information for updating may include a new expiration date and/or a new security code for using the automatic payment method.

If the payment method management platform does not identify the full account identifier or another identification of the expired or expiring automatic payment method, the payment method management platform may infer or deduce an identity of the expired or expiring automatic payment method. In some implementations, the payment method management platform may infer or deduce the identity of the expired or expiring automatic payment method based on other information accessible to the payment method management platform. For example, the other information may include information contained in one or more other emails of the user email account, information relating to one or more automatic payment methods to which the payment method management platform has access, information relating to one or more other recurring payment accounts, and/or the like.

In some implementations, the payment method management platform may associate other or additional recurring payment accounts associated with the expired and/or expiring payment method. For example, the payment method management platform may associate a first recurring payment account, identified in a first email of the scanned set of emails, with the automatic payment method. The association may be based on the first email including at least a portion of an account identifier associated with the automatic payment method.

In some implementations, the payment method management platform may also associate a second recurring payment account, identified in a second email of the scanned set of emails, with the expired or expiring automatic payment method. If the second email does not include an identification of the expired or expiring automatic payment method, the payment method management platform may still be able to associate the second recurring payment account with the expired or expiring automatic payment method.

In some implementations, the second recurring payment account may be associated with the expired or expiring automatic payment method based on the second email indicating that an unspecified automatic payment method has expired or will be expiring within a threshold period. The second recurring payment account may be associated with the expired or expiring automatic payment method based further on the second email having been sent or received within a threshold time of the first email, which is associated with the expired or expiring payment method.

For example, the first email may contain an indication relating to an expiration status of an automatic payment method, an identification of the associated automatic payment method, and/or the first recurring payment account. The second email may include information regarding one or both of an expiration status of an automatic payment method and the second recurring payment account, but not an identification of the associated automatic payment method. Based on timing of the first email and the second email being sent by respective merchant devices, or devices providing a messaging service to the respective merchants, the payment method management platform may infer or deduce that the second recurring payment account is also associated with the automatic payment method identified in the first email.

In this way, the payment method management platform can deduce which expired or expiring automatic payment method is associated with a recurring payment account, even when the email does not specify the associated automatic payment method. This may conserve computing resources that might otherwise be used for the user device to access the email with the indicator related to an expiration status, but that does not specify an associated automatic payment method. Additionally, or alternatively, computing resources may be conserved that might otherwise be spent as the user attempts to access the recurring payment account to determine an associated automatic payment method. Additionally, or alternatively, computing resources may be conserved that might otherwise be used to manually replace the expired or expiring automatic payment method with an updated payment method.

In some implementations, the payment method management platform may use an indicator in a scanned email to determine that the automatic payment method, associated with a first recurring payment account, has expired or will be expiring within a threshold period. The payment method management platform may have access to information identifying a second recurring payment account that is associated with the automatic payment account. The payment method management platform may then determine that an updated automatic payment method is needed for the second recurring payment account. The payment method management platform may then update the second recurring payment account, according to the techniques described herein, without relying on receiving an email or other messaging notification. These techniques can conserve computing resources that may otherwise be used by a merchant device, associated with the second recurring payment account, and/or one or more other devices to generate and provide a notification to the user device regarding the expiration status of the automatic payment method.

As shown by reference number 140, the payment method management platform may obtain authorization to update a payment method for the account(s) associated with the automatic payment method that has expired or will be expiring within the threshold period. In some implementations, the payment method management platform sends, to the user device, one or more messages including information related to the one or more recurring payment accounts associated with the automatic payment method that has expired or will be expiring within the threshold period. The one or more messages may provide the user device with an option to replace the automatic payment method that has expired or will be expiring within the threshold period with an updated payment method (e.g., updated information for the expired or expiring payment method or a different automatic payment method) for the one or more recurring payment accounts.

In some implementations, the payment method management platform may recommend a payment method to replace the expired or expiring payment method. The recommendation may be based on incentives provided to the payment method management platform and/or may be based on incentives provided to the user. For example, the payment method management platform may recommend a payment method based on an amount of cash back, frequent flyer miles, and/or the like provided to the user based on use of the payment method.

In some implementations, the payment method management platform may match the merchant associated with the recurring payment account to a payment method based on a type of merchant and incentive categories associated with the payment method. For example, a payment method, associated with the user and known to the payment method management platform, may have a 4% cash back incentive for using the payment method for paying phone bills. The payment method management platform may match a recurring payment account for paying the user's phone bill with the example payment method with the 4% cash back incentive.

The one or more messages may be in the form of an email, text message, popup notification (e.g., via a browser extension), a message of another messaging application, and/or the like. The one or more messages may include a link to provide authorization to update the payment method for one or more recurring payment accounts associated with the expired or expiring automatic payment method. Additionally, or alternatively, the one or more messages may include an interactive interface through which the user may directly provide authorization.

Sending the one or more messages may be included as one or more actions to maintain continuous service for the one or more recurring payment accounts associated with the automatic payment method.

In some implementations, the payment method management platform may obtain authorization to update a payment method for one or more automatic payment accounts before the payment method management platform detects the one or more emails that contain the one or more indicators. For example, the payment method management platform may receive pre-authorization from the user (e.g., via the user device) to perform one or more actions to maintain continuous service for one or more recurring payment accounts. In some implementations, the user may provide a set of rules for replacing an expired or expiring automatic payment method with an updated payment method. The rules may, for example, instruct the payment method management platform to update payment information for an expired or expiring payment method, replace an expired or expiring payment method with another payment method based on incentives associated with the other payment method, and/or replace an expired or expiring payment method with another payment method based on a user-selected preference for replacing an expired or expiring payment method. In some implementations, the pre-authorization may be implied when the user creates an account with the payment method management platform and/or establishes a relationship with the payment method management platform. In this way, the payment method management platform may reduce an amount of computing resources that would otherwise be used to notify a user of an expired or expiring automatic payment account and/or manually discover and update recurring payment accounts.

As shown by reference number 145, the payment method management platform may replace the expired and/or expiring automatic payment method with an updated payment method. For example, the payment method management platform may communicate with one or more merchant devices associated with the one or more recurring payment accounts to replace (e.g., automatically) the automatic payment method, that has expired or will be expiring within the threshold period, with an updated payment method.

In some implementations, the payment method management platform may be configured to communicate with the one or more merchant devices via an application program interface exposed by the one or more merchant devices.

In some implementations, the payment method management platform may be configured to communicate with the one or more merchant devices by executing an automated script configured to navigate one or more websites hosted on the one or more merchant devices.

In some implementations, the payment method management platform may communicate with the one or more merchant devices to replace an expired or expiring automatic payment method in response to receiving instructions from the user device to carry out the communication. For example, the payment method management platform may provide a message, soliciting input regarding a prospective communication with the one or more merchant devices, to the user device. The message provided to the user device may solicit a selection for replacing or updating the automatic payment method, such as updating payment information for the automatic payment method, providing payment information for a replacement automatic payment method, declining to replace or update the automatic payment method, explicit authorization for communicating with the one or more merchant devices, and/or the like. In some implementations, the one or more messages provided to the user device by the payment method management platform include an interface for making the selection within the one or more messages.

In some implementations, the payment method management platform may replace information associated with an expired payment card on the merchant device with information of a different payment card. In some implementations, the payment method management platform may replace information associated with an expired payment card on the merchant device with updated information of the same payment card.

As shown in FIG. 1C, and by reference number 150, the payment method management platform may scan a set of emails in the user email account. The payment method management platform may scan a text and/or template of each one of the set of emails, a text and/or template of the sender address of each one of the set of emails, or a combination of the two (e.g., based on what is presented to the user via the user device).

As shown by reference number 155, the payment method management platform may detect one or more emails that contain one or more indicators related to an expiration status of an automatic payment method. For example, the payment method management platform may detect the email shown based on the email containing key words that relate to an expiration status of the automatic payment method. In the particular example shown, the email may be detected based on containing the words "credit card" and/or "expire" or any form of expire. Additionally, or alternatively, the email may be detected based on containing the sender address "accounts@merchant.com" based on the entire sender address or a portion thereof (e.g., the email domain).

The techniques described herein may reduce unintended or unnecessary discontinuations of service by a service provider based on an expiration of an automatic payment method. By avoiding unintended or unnecessary discontinuations of service, the techniques may conserve computing resources at the service provider that would otherwise be consumed by canceling an account, identifying the account for discontinuation of service, voiding authorization keys, deleting or archiving files associated with the account, and/or providing notifications of the discontinued service to the user. Additionally, or alternatively, avoiding unintended or unnecessary discontinuations of service may conserve computing resources of a communication network that would otherwise be consumed by carrying a notification of the discontinued service to the user, a response from the user, and any further communications between the two regarding reinstating the service.

Further, avoiding unintended or unnecessary discontinuations of service may conserve additional computing resources at the service provider and the user device that would otherwise by consumed with reinstating the service, including computing resources for identifying an account for reinstitution of service, generating or reactivating authorization keys, restoring archived files or generating new files associated with the account, generating new contracts for the account, and/or generating notifications for the user.

As indicated above, FIGS. 1A-1C are provided as one or more examples of one or more actions that may be performed by the payment method management platform to maintain continuous service for the one or more recurring payment accounts. Other examples may differ from what is described with regard to FIGS. 1A-1C. For example, messaging services other than email may be used within the context of the described techniques. For example, a set of other messages may be used instead of the set of emails, such as a set of text messages, instant messages, voicemail messages, or messages of another messaging application. Additionally, or alternatively, a server for another set of messages may be used instead of an email server, and/or a user messaging account may be used instead of a user email account.

In some implementations, a service provider may send a message to a user to indicate any failure of an automatic payment method. For example, the automatic payment method may fail based on exceeding a balance limit or a daily spending limit. The payment method management platform may then perform one or more actions to maintain continuous service for a recurring payment account, such as those actions discussed herein.

Figure 2:
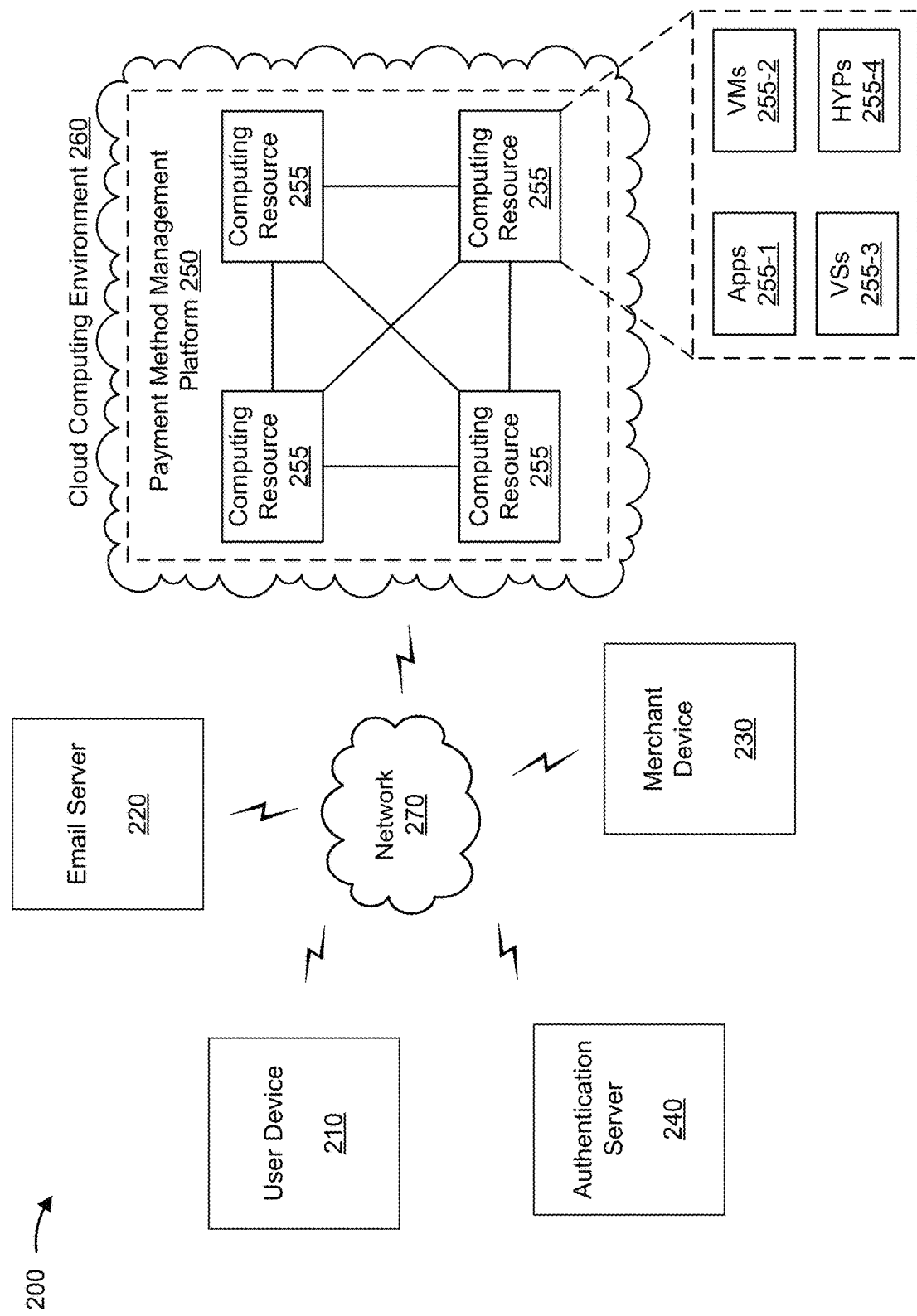
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, an email server 220, a merchant device 230, an authentication server 240, a payment method management platform 250 having at least one computing resource 255, a cloud computing environment 260, and a network 270. Devices of environment 200 may interconnect via wired connections, wireless connections, or a combination of wired and wireless connections.

User device 210 includes one or more devices capable of receiving, generating, storing, processing, and/or providing information associated with an automatic payment method. For example, user device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

Email server 220 includes one or more devices capable of receiving, generating storing, processing, and/or providing data described herein. For example, email server 220 may include a server (e.g., in a data center or a cloud computing environment), a data center (e.g., a multi-server micro datacenter), a workstation computer, a virtual machine (VM) provided in a cloud computing environment, or a similar type of device. In some implementations, email server 220 may include a communication interface that allows email server 220 to receive information from and/or transmit information to other devices in environment 200. In some implementations, email server 220 may be a physical device implemented within a housing, such as a chassis. In some implementations, email server 220 may be a virtual device implemented by one or more computer devices of a cloud computing environment or a data center.

Email server 220 may store, or have access to, data associated with one or more user email accounts. The email server 220 may grant access to the data in response to receiving credentials, a valid token, or other authorization to access a user email account. In some implementations, email server 220 may exchange credentials with user device 210 in a process to authorize the user device 210 to grant access to the user email account. For example, the email server 220 may grant access to the user email account to payment method management platform 250 based on receiving a token associated with the user email account, and based on a determination that the token is valid for accessing the user email account.

Merchant device 230 includes one or more devices capable of receiving, generating storing, processing, and/or providing data described herein. For example, merchant device 230 may include a server (e.g., in a data center or a cloud computing environment), a data center (e.g., a multi-server micro datacenter), a workstation computer, a virtual machine (VM) provided in a cloud computing environment, or a similar type of device. In some implementations, merchant device 230 may include a communication interface that allows merchant device 230 to receive information from and/or transmit information to other devices in environment 200. In some implementations, merchant device 230 may be a physical device implemented within a housing, such as a chassis. In some implementations, merchant device 230 may be a virtual device implemented by one or more computer devices of a cloud computing environment or a data center.

Merchant device 230 may provide a service, such as a video streaming service, a recurring shipment of physical goods, a loan, a phone connection, and/or the like. When a user requests access to the service, the merchant device 230 may receive, from user device 210 or otherwise, information relating to a payment method. In some implementations, the merchant device 230 may associate, in storage accessible to the merchant device 230, the payment method (e.g., automatic payment method) with a recurring payment account for the user's access to the service. The payment method may identify an expiration date of the payment method, which may also be stored with the payment method and recurring payment account. The merchant device 230 may include a system for providing notifications, via messages such as emails, to users regarding an expiration status of the payment method. In some implementations, the merchant device 230 may include an interface for receiving information to update or replace a payment method.

Authentication server 240 includes one or more devices capable of receiving, generating, storing, processing, and/or providing information associated with a token (e.g., an OAuth token). In some implementations, authentication server 240 may be hosted in cloud computing environment. In some implementations, authentication server 240 may include a server device (e.g., a host server, a web server, an application server, etc.), a data center device, or a similar device.

In some implementations, authentication server 240 may receive a request to generate a token that grants a device access to an email account or other secure information. For example, authentication server 240 may receive a request from user device 210 to generate a token to grant full or limited access to a user email account associated with the user. The request may further designate another device, such as the payment method management platform, to receive the token. In some implementations, the authentication server 240 delivers the token to the designated device. In some implementations, the authentication server 240 delivers the token to the source of the request to generate the token, which can then forward the token to another device. In some implementations, the authentication server 240 may provide information to a device that determines whether to grant access to the email account or other secure information, such that the device may determine whether a token is valid. For example, the information may allow the device to locally determine whether to grant access, or the information may allow the device to submit a validity request to the authentication server 240, which can then indicate whether the token is valid.

Payment method management platform 250 includes one or more devices capable of receiving, generating, storing, processing, and/or providing information associated with a payment method and/or a recurring payment account. For example, payment method management platform 250 may include a server device (e.g., a host server, a web server, an application server, etc.), a data center device, or a similar device. In some implementations, payment method management platform 250 may receive a token for accessing an email account, provide the token in a request to access to the email account, and/or obtain access to the email account. Additionally, or alternatively, payment method management platform 250 may scan a set of emails in the email account for indicators related to an expiration of an automatic payment method to detect one or more emails that contain an indicator. In some implementations, payment method management platform 250 identifies a recurring payment account associated with the automatic payment method and performs actions to maintain continuous service for the one or more recurring payment accounts.

In some implementations, as shown, payment method management platform 250 may be hosted in cloud computing environment 260. Notably, while implementations described herein describe payment method management platform 250 as being hosted in cloud computing environment 260, in some implementations, payment method management platform 250 might not be cloud-based (i.e., may be implemented outside of a cloud computing environment) or might be partially cloud-based.

Cloud computing environment 260 includes an environment that hosts payment method management platform 250. Cloud computing environment 260 may provide computation, software, data access, storage, and/or other services that do not require end-user knowledge of a physical location and configuration of system(s) and/or device(s) that host payment method management platform 250. As shown, cloud computing environment 260 may include a group of computing resource 255 (referred to collectively as "computing resources 255 and individually as "computing resource 255").

Computing resource 255 includes one or more personal computers, workstation computers, server devices, or another type of computation and/or communication device. In some implementations, computing resource 255 may host payment method management platform 250. The cloud resources may include compute instances executing in computing resource 255, storage devices provided in computing resource 255, data transfer devices provided by computing resource 255, etc. In some implementations, computing resource 255 may communicate with other computing resources 255 via wired connections, wireless connections, or a combination of wired and wireless connections.

As further shown in FIG. 2, computing resource 255 may include a group of cloud resources, such as one or more applications ("APPs") 255-1, one or more virtual machines ("VMs") 255-2, virtualized storage ("VSs") 255-3, one or more hypervisors ("HYPs") 255-4, and/or the like.

Applications 255-1 includes one or more software applications that may be provided to or accessed by user device 210. Application 255-1 may eliminate a need to install and execute the software applications on user device 210. For example, application 255-1 may include software associated with payment method management platform 250 and/or any other software capable of being provided via cloud computing environment 260. In some implementations, one or more of applications 255-1 may send/receive information to/from one or more other applications 255-1, via virtual machine 255-2.

Virtual machine 255-2 includes a software implementation of a machine (e.g., a computer) that executes programs like a physical machine. Virtual machine 255-2 may be either a system virtual machine or a process virtual machine, depending upon use and degree of correspondence to any real machine by virtual machine 255-2. A system virtual machine may provide a complete system platform that supports execution of a complete operating system ("OS"). A process virtual machine may execute a single program, and may support a single process. In some implementations, virtual machine 255-2 may execute on behalf of a user (e.g., user device 210), and may manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 may present a virtual operating platform to the guest operating systems, and may manage the execution of the guest operating systems. Multiple instances of a variety of operating systems may share virtualized hardware resources.

Network 270 includes one or more wired and/or wireless networks. For example, network 270 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
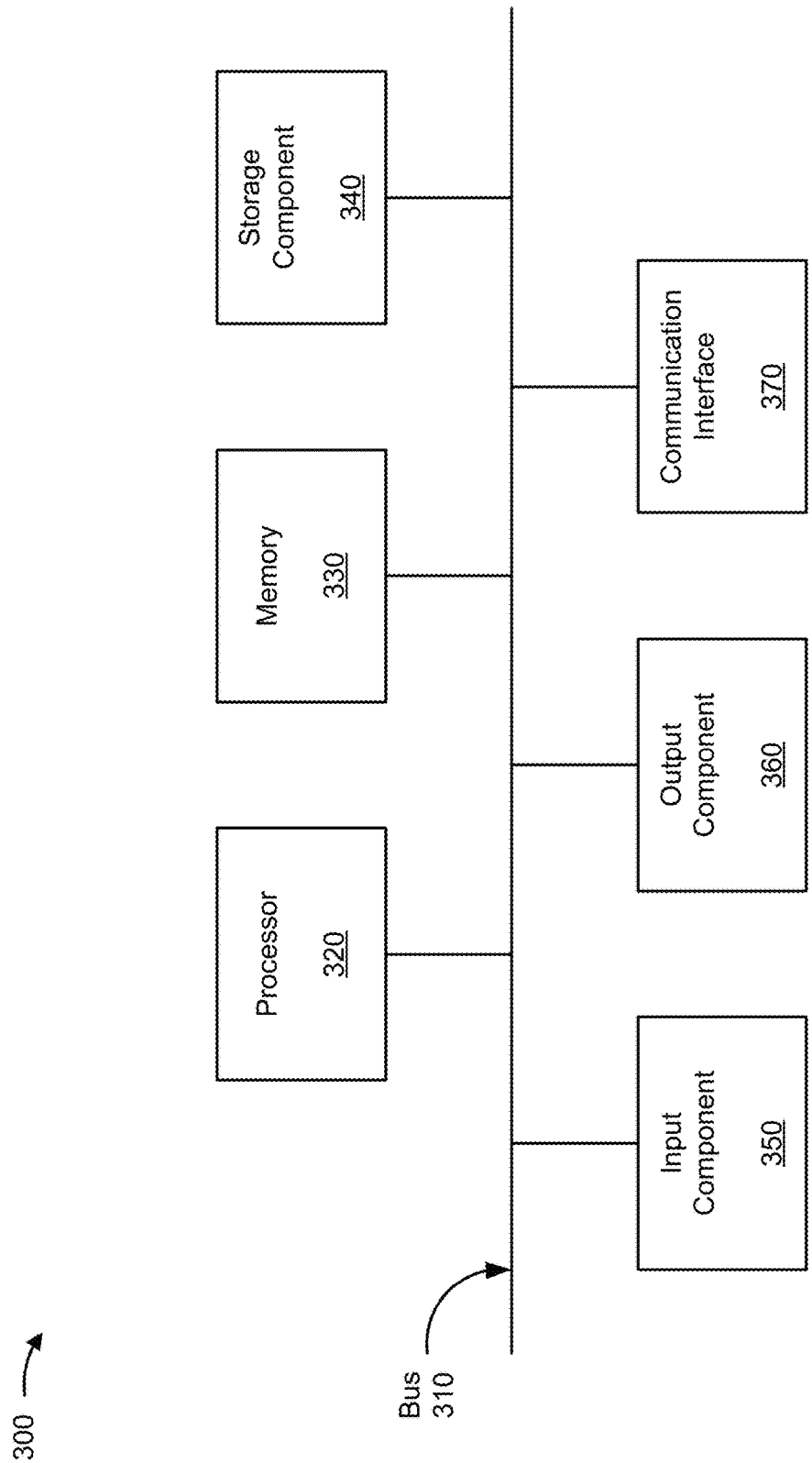
FIG. 3 is a diagram of example components of one or more devices of FIG. 2.

FIG. 3 is a diagram of example components of a device 300. Device 300 may correspond to user device 210, email server 220, merchant device 230, authentication server 240, and/or payment method management platform 250. In some implementations, user device 210, email server 220, merchant device 230, authentication server 240, and/or payment method management platform 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RANI), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
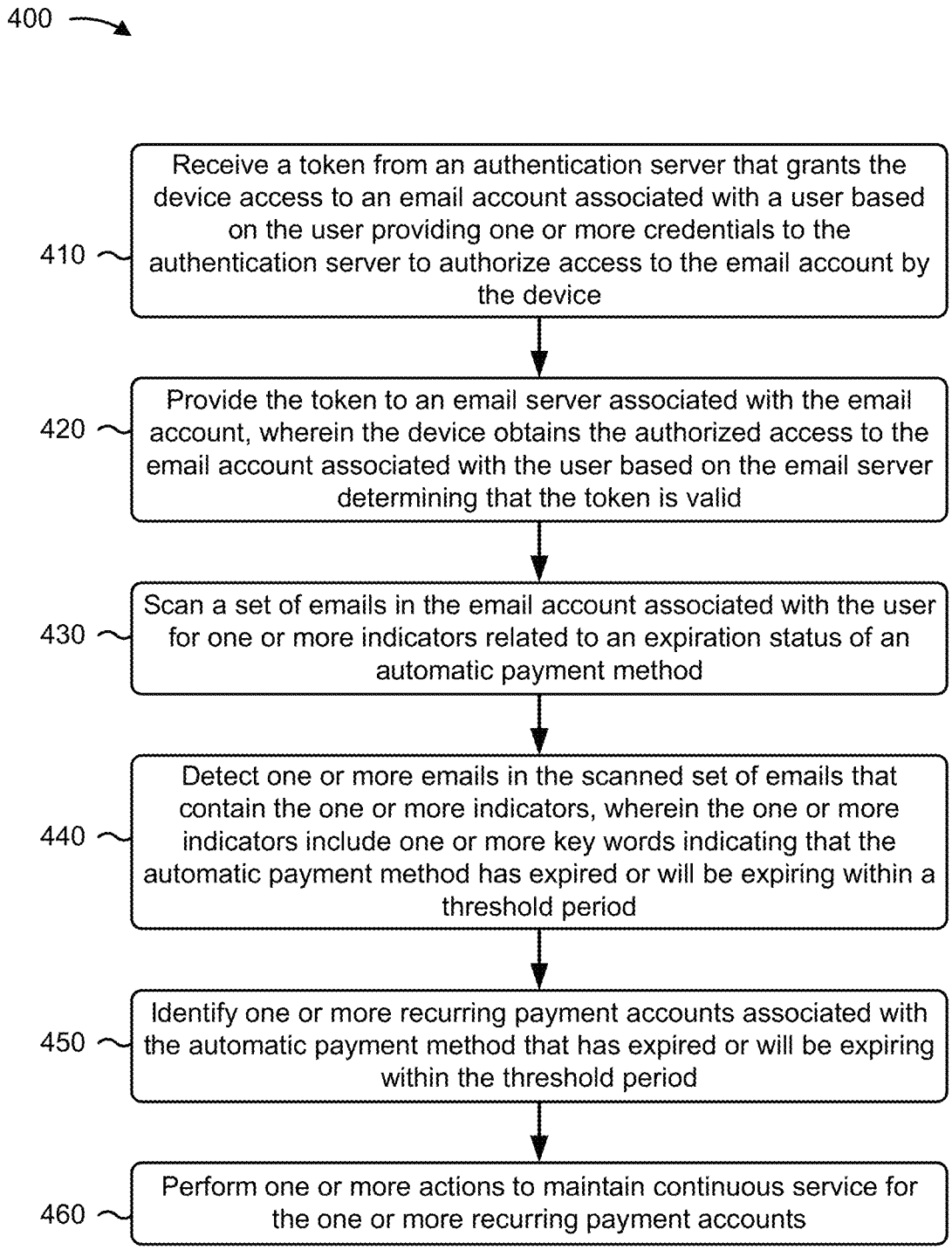
FIGS. 4-6 are flowcharts of example processes relating to updating an automatic payment method to avoid service disruption.

FIG. 4 is a flow chart of an example process 400 relating to updating an automatic payment method to avoid service disruption. In some implementations, one or more process blocks of FIG. 4 may be performed by a device (e.g., payment method management platform 250). In some implementations, one or more process blocks of FIG. 4 may be performed by another device or a group of devices separate from or including the device, such as a user device (e.g., user device 210), an email server (e.g., email server 220), an authentication server (e.g., authentication server 240), and/or the like.

As shown in FIG. 4, process 400 may include receiving a token from an authentication server that grants the device access to an email account associated with a user based on the user providing one or more credentials to the authentication server to authorize access to the email account by the device (block 410). For example, the device (e.g., using computing resource 255, processor 320, memory 330, storage component 340, input component 350, output component 360, communication interface 370 and/or the like) may receive a token from an authentication server that grants the device access to an email account associated with a user based on the user providing one or more credentials to the authentication server to authorize access to the email account by the device, as described above.

As further shown in FIG. 4, process 400 may include providing the token to an email server associated with the email account, wherein the device obtains the authorized access to the email account associated with the user based on the email server determining that the token is valid (block 420). For example, the device (e.g., using computing resource 255, processor 320, memory 330, storage component 340, input component 350, output component 360, communication interface 370 and/or the like) may provide the token to an email server associated with the email account, as described above. In some implementations, the device may obtain the authorized access to the email account associated with the user based on the email server determining that the token is valid, as described above.

As further shown in FIG. 4, process 400 may include scanning a set of emails in the email account associated with the user for one or more indicators related to an expiration status of an automatic payment method (block 430). For example, the device (e.g., using computing resource 255, processor 320, memory 330, storage component 340, input component 350, output component 360, communication interface 370 and/or the like) may scan a set of emails in the email account associated with the user for one or more indicators related to an expiration status of an automatic payment method, as described above.

As further shown in FIG. 4, process 400 may include detecting one or more emails in the scanned set of emails that contain the one or more indicators, wherein the one or more indicators include one or more key words indicating that the automatic payment method has expired or will be expiring within a threshold period (block 440). For example, the device (e.g., using computing resource 255, processor 320, memory 330, storage component 340, input component 350, output component 360, communication interface 370 and/or the like) may detect one or more emails in the scanned set of emails that contain the one or more indicators, as described above. In some implementations, the one or more indicators include one or more key words indicating that the automatic payment method has expired or will be expiring within a threshold period.

As further shown in FIG. 4, process 400 may include identifying one or more recurring payment accounts associated with the automatic payment method that has expired or will be expiring within the threshold period (block 450). For example, the device (e.g., using computing resource 255, processor 320, memory 330, storage component 340, input component 350, output component 360, communication interface 370 and/or the like) may identify one or more recurring payment accounts associated with the automatic payment method that has expired or will be expiring within the threshold period, as described above.

As further shown in FIG. 4, process 400 may include performing one or more actions to maintain continuous service for the one or more recurring payment accounts (block 460). For example, the device (e.g., using computing resource 255, processor 320, memory 330, storage component 340, input component 350, output component 360, communication interface 370 and/or the like) may perform one or more actions to maintain continuous service for the one or more recurring payment accounts, as described above.

Process 400 may include additional implementations, such as any single implementation or any combination of implementations described below and/or in connection with one or more other processes described elsewhere herein.

In a first implementation, the set of emails is scanned for the one or more indicators using a natural language processing technique.

In a second implementation, alone or in combination with the first implementation, the one or more indicators further include one or more email templates providing a structure for notifying a user that the automatic payment method has expired or will be expiring within a threshold period.

In a third implementation, alone or in combination with one or more of the first and second implementations, the one or more recurring payment accounts associated with the automatic payment method include: a first recurring payment account identified in a first email, in the scanned set of emails, based on the first email including at least a portion of an account number associated with the automatic payment method, and a second recurring payment account identified in a second email, in the scanned set of emails, based on the second email indicating that an unspecified automatic payment method has expired or will be expiring within a threshold period and based further on the second email having been sent within a threshold time of the first email.

In a fourth implementation, alone or in combination with one or more of the first through third implementations, the set of emails is scanned based on the set of emails originating from one or more senders that appear in a whitelist.

In a fifth implementation, alone or in combination with one or more of the first through fourth implementations, the one or more actions include sending, to a user device, one or more messages including information related to the one or more recurring payment accounts associated with the automatic payment method that has expired or will be expiring within the threshold period, and the one or more messages provide the user device with an option to replace the automatic payment method that has expired or will be expiring within the threshold period with an updated payment method.

In a sixth implementation, alone or in combination with one or more of the first through fifth implementations, the one or more actions include communicating with one or more merchant devices associated with the one or more recurring payment accounts to automatically replace the automatic payment method that has expired or will be expiring within the threshold period with an updated payment method.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
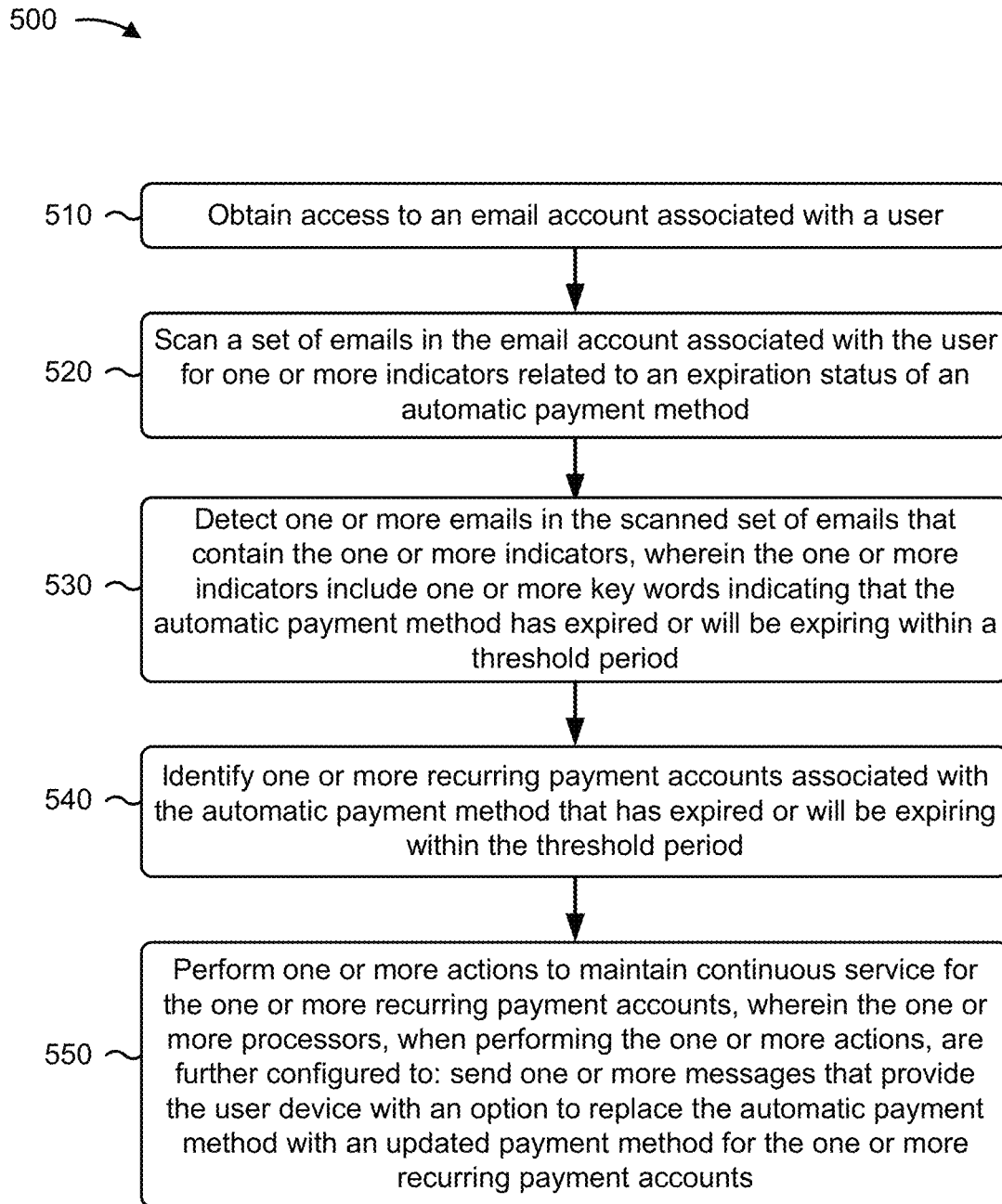

FIG. 5 is a flow chart of an example process 500 relating to updating an automatic payment method to avoid service disruption. In some implementations, one or more process blocks of FIG. 5 may be performed by a device (e.g., payment method management platform 250). In some implementations, one or more process blocks of FIG. 5 may be performed by another device or a group of devices separate from or including the device, such as a user device (e.g., user device 210), an email server (e.g., email server 220), an authentication server (e.g., authentication server 240), and/or the like.

As shown in FIG. 5, process 500 may include obtaining access to an email account associated with a user (block 510). For example, the device (e.g., using computing resource 255, processor 320, memory 330, storage component 340, input component 350, output component 360, communication interface 370 and/or the like) may obtain access to an email account associated with a user, as described above.

As further shown in FIG. 5, process 500 may include scanning a set of emails in the email account associated with the user for one or more indicators related to an expiration status of an automatic payment method (block 520). For example, the device (e.g., computing resource 255, processor 320, memory 330, storage component 340, input component 350, output component 360, communication interface 370 and/or the like) may scan a set of emails in the email account associated with the user for one or more indicators related to an expiration status of an automatic payment method, as described above.

As further shown in FIG. 5, process 500 may include detecting one or more emails in the scanned set of emails that contain the one or more indicators, wherein the one or more indicators include one or more key words indicating that the automatic payment method has expired or will be expiring within a threshold period (block 530). For example, the payment method management platform (e.g., using computing resource 255, processor 320, memory 330, storage component 340, input component 350, output component 360, communication interface 370 and/or the like) may detect one or more emails in the scanned set of emails that contain the one or more indicators. In some implementations, the one or more indicators include one or more key words indicating that the automatic payment method has expired or will be expiring within a threshold period, as described above.

As further shown in FIG. 5, process 500 may include identifying one or more recurring payment accounts associated with the automatic payment method that has expired or will be expiring within the threshold period (block 540). For example, the device (e.g., using computing resource 255, processor 320, memory 330, storage component 340, input component 350, output component 360, communication interface 370 and/or the like) may identify one or more recurring payment accounts associated with the automatic payment method that has expired or will be expiring within the threshold period, as described above.

As further shown in FIG. 5, process 500 may include performing one or more actions to maintain continuous service for the one or more recurring payment accounts, wherein the device, when performing the one or more actions, is further configured to send, to a user device, one or more messages that provide the user device with an option to replace the automatic payment method with an updated payment method for the one or more recurring payment accounts (block 550). For example, the device (e.g., using computing resource 255, processor 320, memory 330, storage component 340, input component 350, output component 360, communication interface 370 and/or the like) may perform one or more actions to maintain continuous service for the one or more recurring payment accounts and send, to a user device, one or more messages that provide the user device with an option to replace the automatic payment method with an updated payment method for the one or more recurring payment accounts, as described above.

Process 500 may include additional implementations, such as any single implementation or any combination of implementations described below and/or in connection with one or more other processes described elsewhere herein.

In a first implementation, the one or more processors, when performing the one or more actions, are further configured to communicate with one or more merchant devices associated with the one or more recurring payment accounts to replace the automatic payment method with the updated payment method based on the user device selecting the option provided in the one or more messages.

In a second implementation, alone or in combination with the first implementation, the one or more processors are configured to communicate with the one or more merchant devices via an application program interface exposed by the one or more merchant devices.

In a third implementation, alone or in combination with one or more of the first and second implementations, the one or more processors are configured to communicate with the one or more merchant devices by executing an automated script configured to navigate one or more websites hosted on the one or more merchant devices.

In a fourth implementation, alone or in combination with one or more of the first through third implementations, the access to the email account associated with the user is obtained based on a token received from an authentication server.

In a fifth implementation, alone or in combination with one or more of the first through fourth implementations, the access to the email account associated with the user is obtained based on a delegation request received via a browser extension interfacing with one or more processors of the device.

In a sixth implementation, alone or in combination with one or more of the first through fifth implementations, the set of emails is scanned for the one or more indicators using a natural language processing technique.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
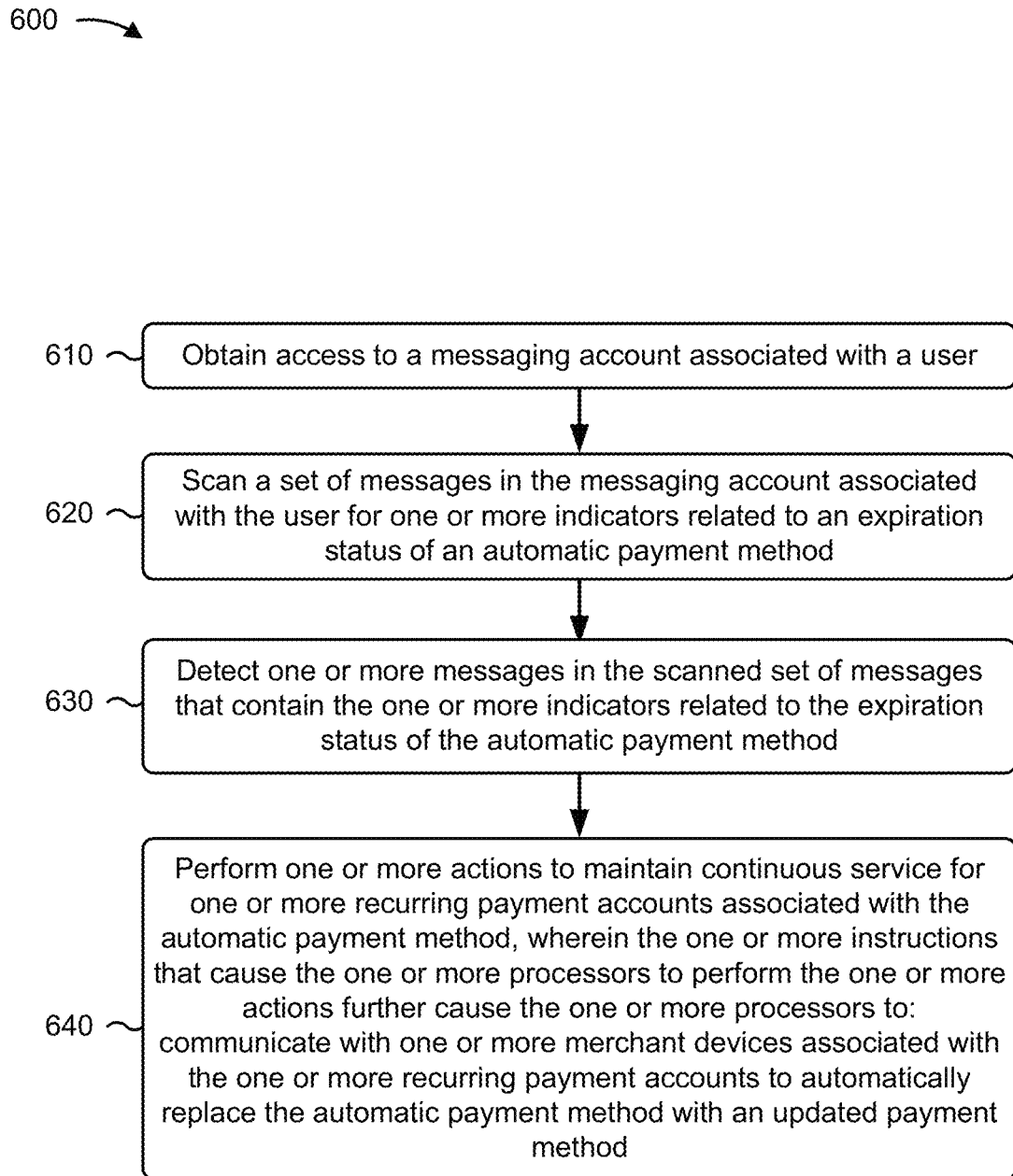

FIG. 6 is a flow chart of an example process 600 relating to updating an automatic payment method to avoid service disruption. In some implementations, one or more process blocks of FIG. 6 may be performed by a device (e.g., payment method management platform 250). In some implementations, one or more process blocks of FIG. 6 may be performed by another device or a group of devices separate from or including the device, such as a user device (e.g., user device 210), an email server (e.g., email server 220), an authentication server (e.g., authentication server 240), and/or the like.

As shown in FIG. 6, process 600 may include obtaining access to a messaging account associated with a user (block 610). For example, the device (e.g., using computing resource 255, processor 320, memory 330, storage component 340, input component 350, output component 360, communication interface 370 and/or the like) may obtain access to a messaging account associated with a user, as described above.

As further shown in FIG. 6, process 600 may include scanning a set of messages in the messaging account associated with the user for one or more indicators related to an expiration status of an automatic payment method (block 620). For example, the device (e.g., using computing resource 255, processor 320, memory 330, storage component 340, input component 350, output component 360, communication interface 370 and/or the like) may scan a set of messages in the messaging account associated with the user for one or more indicators related to an expiration status of an automatic payment method, as described above.

As further shown in FIG. 6, process 600 may include detecting one or more messages in the scanned set of messages that contain the one or more indicators related to the expiration status of the automatic payment method (block 630). For example, the device (e.g., using computing resource 255, processor 320, memory 330, storage component 340, input component 350, output component 360, communication interface 370 and/or the like) may detect one or more messages in the scanned set of messages that contain the one or more indicators related to the expiration status of the automatic payment method, as described above.

As further shown in FIG. 6, process 600 may include performing one or more actions to maintain continuous service for one or more recurring payment accounts associated with the automatic payment method, wherein the one or more instructions that cause the one or more processors to perform the one or more actions further cause the one or more processors communicate with one or more merchant devices associated with the one or more recurring payment accounts to automatically replace the automatic payment method with an updated payment method (block 640). For example, the device (e.g., using computing resource 255, processor 320, memory 330, storage component 340, input component 350, output component 360, communication interface 370 and/or the like) may perform one or more actions to maintain continuous service for one or more recurring payment accounts associated with the automatic payment method and communicate with one or more merchant devices associated with the one or more recurring payment accounts to automatically replace the automatic payment method with an updated payment method, as described above.

Process 600 may include additional implementations, such as any single implementation or any combination of implementations described below and/or in connection with one or more other processes described elsewhere herein.

In a first implementation, the one or more instructions cause the one or more processors to communicate with the one or more merchant devices via an application program interface exposed by the one or more merchant devices.

In a second implementation, alone or in combination with the first implementation, the one or more instructions cause the one or more processors to communicate with the one or more merchant devices by executing an automated script configured to navigate one or more websites hosted on the one or more merchant devices.

In a third implementation, alone or in combination with one or more of the first and second implementations, the one or more instructions that cause the one or more processors to obtain the access to the messaging account associated with the user further cause the one or more processors to receive, from an authentication server, a token granting the access to the messaging account associated with the user, and provide the token to a messaging server associated with the messaging account. In some implementations, the access to the messaging account associated with the user is obtained based on the messaging server determining that the token is valid.

In a fourth implementation, alone or in combination with one or more of the first through third implementations, the access to the messaging account associated with the user is obtained based on a delegation request received via a browser extension interfacing with the one or more processors.

In a fifth implementation, alone or in combination with one or more of the first through fourth implementations, the set of messages is scanned for the one or more indicators using a natural language processing technique.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, access to an email account associated with a user;
   scanning, by the device and based on obtaining the access to the email account, a set of emails in the email account for one or more first key words related to an expiration status associated with an automatic payment method associated with the user, wherein the expiration status associated with the automatic payment method is related to a payment card;
determining, by the device and based on scanning the set of emails, whether the automatic payment method has expired or will be expiring within a threshold period;
identifying, by the device, based on one or more second key words from the set of emails, one or more recurring payment accounts, wherein the identifying the one or more recurring payment accounts comprises:
identifying a first recurring payment account of the one or more recurring payment accounts from a first email of the scanned set of emails, based on determining that the automatic payment method has expired or will be expiring within the threshold period;
identifying a second recurring payment account of the one or more recurring payment accounts, from a second email of the scanned set of emails,
wherein identifying the second recurring payment account further comprises determining, in the second email, that an unspecified automatic payment method has expired or will be expiring within the threshold period, and that the second email was sent within a threshold time period from a time the first email was sent;
associating the second recurring payment account with the automatic payment method based on determining that the second email was received within the threshold time period from receiving the first email; and
replacing, by the device, based on the identified first recurring payment account and based on the identified second recurring payment account, the automatic payment method with an updated payment method, by communicating with one or more merchant devices via at least one of:
an application programming interface associated with the one or more merchant devices, or
executing instructions to navigate one or more websites hosted by the one or more merchant devices.

2. The method of claim 1, wherein the access to the email account is obtained based on a token received from an authentication server.

3. The method of claim 1, wherein the access to the email account is obtained based on a token received from an authentication server,
wherein the token is associated with a type of access to the email account, and
wherein the type of access is associated with at least one of:
full access,
read-only access, or
access to emails that contain a particular characteristic.

4. The method of claim 1, wherein the scanning the set of emails further comprising:
scanning, based on determining that address information associated with a particular email of the set of emails appears in a whitelist, the particular email.

5. The method of claim 1, further comprising:
determining, based on comparing at least one of the one or more first key words or the one or more second key words with one or more third keywords that were previously identified, scores to associate with the set of emails.

6. The method of claim 1, wherein the set of emails are scanned using one or more templates that provide a structure for notifying that the automatic payment method has expired or will be expiring within the threshold period.

7. The method of claim 1, wherein replacing the automatic payment method with the updated payment method further comprises:
recommending the updated payment method based on relating a type of merchant associated with the updated payment method to a merchant associated with the identified one or more recurring payment accounts.

8. A device, comprising:
one or more memories; and
one or more processors communicatively coupled to the one or more memories, configured to:
scan, based on obtaining access to an email account associated with a user, a set of emails in the email account for one or more first key words related to an expiration status associated with a payment method associated with the user,
wherein the expiration status associated with the payment method is related to a payment card;
determine, based on scanning the set of emails, whether the payment method has expired or will be expiring within a threshold period;
identify based on one or more second key words from the set of emails, one or more recurring payment accounts associated with the payment method, wherein the identifying the one or more recurring payment accounts comprises:
identifying a first recurring payment account of the one or more recurring payment accounts from a first email of the scanned set of emails, based on determining that the payment method has expired or will be expiring within the threshold period;
identifying a second recurring payment account of the one or more recurring payment accounts, from a second email of the scanned set of emails,
wherein identifying the second recurring payment account further comprises determining, in the second email, that an unspecified automatic payment method has expired or will be expiring within the threshold period, and that the second email was sent within a threshold time period from a time the first email was sent;
associating the second recurring payment account with the payment method based on determining that the second email was received within the threshold time period from receiving the first email; and
replace, based on the identified first recurring payment account and based on the identified second recurring payment account, the payment method with an updated payment method, by communicating with one or more merchant devices via at least one of:
an application programming interface associated with the one or more merchant devices, or
executing instructions to navigate one or more websites hosted by the one or more merchant devices.

9. The device of claim 8, wherein the access to the email account is obtained based on a token received from an authentication server.

10. The device of claim 8, wherein the access to the email account is obtained based on a token received from an authentication server,
wherein the token is associated with a type of access to the email account, and wherein the type of access is associated with at least one of:
full access,
read-only access, or
access to emails that contain a particular characteristic.

11. The device of claim 8, wherein the access to the email account is obtained via at least one of:
an extension to an application, or
a web browser extension.

12. The device of claim 8, wherein the one or more processors, to scan the set of emails, are configured to:
scan, based on determining that address information associated with a particular email of the set of emails appears in a whitelist, the particular email.

13. The device of claim 8, wherein the one or more processors are further configured to:
determine, based on comparing at least one of the one or more first key words or the one or more second key words with one or more third keywords that were previously identified, scores to associate with the set of emails.

14. The device of claim 8, wherein the set of emails are scanned using one or more templates that provide a structure for notifying that the payment method has expired or will be expiring within the threshold period.

15. A non-transitory computer-readable medium storing a set of instructions, the set of instructions comprising:
one or more instructions that, when executed by one or more processors of a device, cause the one or more processors of the device to:
scan, based on obtaining access to an email account associated with a user, a set of emails in the email account for one or more first key words related to an expiration status associated with an automatic payment method associated with the user,
wherein the expiration status associated with the automatic payment method is related to a payment card;
determine, based on scanning the set of emails, whether the automatic payment method has expired or will be expiring within a threshold period;
identify based on one or more second key words from the set of emails, one or more recurring payment accounts, wherein the identifying the one or more recurring payment accounts comprises:
identifying a first recurring payment account of the one or more recurring payment accounts from a first email of the scanned set of emails, based on determining that the automatic payment method has expired or will be expiring within the threshold period;
identifying a second recurring payment account of the one or more recurring payment accounts, from a second email of the scanned set of emails,
wherein identifying the second recurring payment account further comprises determining, in the second email, that an unspecified automatic payment method has expired or will be expiring within the threshold period, and that the second email was sent within a threshold time period from a time the first email was sent;
associating the second recurring payment account with the automatic payment method based on determining that the second email was received within the threshold time period from receiving the first email; and
replace, based on the identified first recurring payment account and based on the identified second recurring payment account, the automatic payment method with an updated payment method, by communicating with one or more merchant devices via at least one of:
an application programming interface associated with the one or more merchant devices, or
executing instructions to navigate one or more websites hosted by the one or more merchant devices.

16. The non-transitory computer-readable medium of claim 15, wherein the access to the email account is obtained based on a token received from an authentication server.

17. The non-transitory computer-readable medium of claim 15, wherein the access to the email account is obtained based on a token received from an authentication server,
wherein the token is associated with a type of access to the email account, and
wherein the type of access is associated with at least one of:
full access,
read-only access, or
access to emails that contain a particular characteristic.

18. The non-transitory computer-readable medium of claim 15, wherein the one or more instructions further cause the one or more processors of the device to:
scan, based on determining that address information associated with a particular email of the set of emails appears in a whitelist, the particular email.

19. The non-transitory computer-readable medium of claim 15, wherein the one or more instructions further cause the one or more processors of the device to:
determine, based on comparing at least one of the one or more first key words or the one or more second key words with one or more third keywords that were previously identified, scores to associate with the set of emails.

20. The non-transitory computer-readable medium of claim 15, wherein the set of emails are scanned using one or more templates that provide a structure for notifying that the automatic payment method has expired or will be expiring within the threshold period.

* * * * *